(12) United States Patent
Ward

(10) Patent No.: US 7,114,546 B2
(45) Date of Patent: Oct. 3, 2006

(54) TIRE MOLD AND METHOD FOR MAKING A TIRE MOLD

(75) Inventor: Keith Ward, Simpsonville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/122,415

(22) Filed: May 4, 2005

(65) Prior Publication Data

US 2005/0249833 A1 Nov. 10, 2005

Related U.S. Application Data

(63) Continuation of application No. PCT/US03/34353, filed on Oct. 28, 2003.

(60) Provisional application No. 60/423,688, filed on Nov. 4, 2002.

(51) Int. Cl.
*B22C 9/00* (2006.01)

(52) U.S. Cl. .............................. 164/6; 164/17; 164/24; 164/27; 425/46

(58) Field of Classification Search ............... 425/28.1, 425/36, 46, 812; 164/6, 15, 17, 24, 27
See application file for complete search history.

(56) References Cited

U.S. PATENT DOCUMENTS

| | | | | |
|---|---|---|---|---|
| 1,634,106 A * | 6/1927 | Hopkinson | ................... | 425/36 |
| 1,776,145 A * | 9/1930 | Bungay | ........................ | 425/47 |
| 2,243,521 A * | 5/1941 | Bishop | ........................ | 205/70 |
| 2,263,001 A * | 11/1941 | Bean et al. | .................... | 164/10 |
| 2,275,582 A * | 3/1942 | Bull | ............................ | 205/70 |
| 2,848,910 A * | 8/1958 | Bastian | ........................ | 164/24 |
| 3,520,024 A * | 7/1970 | Caretta et al. | ................ | 425/47 |
| 3,797,979 A * | 3/1974 | Greenwood | ................... | 425/46 |
| 3,937,606 A * | 2/1976 | Morheng | ................... | 425/28.1 |
| 4,446,093 A * | 5/1984 | Mattson | ..................... | 425/28.1 |
| 5,382,402 A * | 1/1995 | Espie et al. | ................. | 425/812 |
| 5,676,980 A * | 10/1997 | Gulka et al. | .................. | 425/46 |
| 6,123,130 A * | 9/2000 | Himuro et al. | .......... | 152/209.3 |
| 6,382,943 B1 * | 5/2002 | Metz et al. | ................... | 425/46 |
| 6,491,854 B1 * | 12/2002 | Sano | ........................... | 164/24 |
| 6,826,819 B1 * | 12/2004 | Sinfield | ....................... | 425/46 |

\* cited by examiner

*Primary Examiner*—James P. Mackey
(74) *Attorney, Agent, or Firm*—E. Martin Remick; A. Arnold

(57) ABSTRACT

A tire mold according to the invention includes a plurality of tread sectors for forming a tread portion of a tire and two shell inserts for molding the sidewalls of a tire wherein the tread sectors and the shell inserts are castings formed from the same model. A method for manufacturing a mold in accordance with the invention includes the steps of providing a casting model having the tread and sidewall features of a tire, the casting model having parting zones between the tread and sidewall, casting an element from the model, the cast element accordingly having parting zones between the tread and sidewall portions, and separating the cast element into a plurality of tread sectors and opposing sidewall shells. An advantage of casting the molding parts, the tread sectors and sidewall shells from a single casting model is that deeper and more complex features can be formed in the sidewall shells, and the features extending from the tread onto the sidewall can be better aligned and better conformed in size, shape and appearance.

3 Claims, 6 Drawing Sheets

TIRE MOLD AND METHOD FOR MAKING A TIRE MOLD

This application is a continuation of International Application Serial Number PCT/US03/34353, filed Oct. 28, 2003, which claims benefit under 35 USC 119(e) of U.S. Provisional Application Ser. No. 60/423,688, filed Nov. 4, 2002.

FIELD OF THE INVENTION

The invention concerns a mold for a tire and a method for making the mold. More particularly, the invention concerns a segmented tire mold having a tread ring formed of a plurality of movable sectors for molding a tire tread and sidewall rings for molding the tire sidewall.

BACKGROUND AND SUMMARY

A recent trend in tire design has been to extend features of the tread relatively far onto the sidewall of the tire. In many cases, the features extend to at least the tire equator. Tread features, for example, grooves, ribs, and blocks, are relatively deep or tall compared to the features typically formed on the sidewall, such as indicia or lettering.

In conventional molds, the tread ring is formed by taking an aluminum casting using a model. The sidewall shells are made by machining steel plate to have the desired molding elements. To form deep tread-like features in the sidewall shell poses difficulties, for example, in aligning the features with the tread rings and in machining deep or complex features in the sidewall shell surface.

The invention provides an improved tire mold and a method for manufacturing an improved tire mold that overcomes the difficulties in the art and provides additional advantages.

The invention is preferably applied to a two-piece segmented mold, the type which parts along or near an axial center line of the mold cavity and includes an upper half and a lower half, each half having tread sectors and a sidewall shell. Other molds may advantageously use the invention, for example, a one-piece segmented mold, in which the tread segments are not split along the axial center, but are mounted to either the top or the bottom half of the mold, and mounted to pivot away upon opening the mold.

A tire mold according to the invention includes a plurality of tread sectors for forming a tread portion of a tire, a mold back for supporting the tread sectors and permitting movement between an open position and a closed position, two shell inserts for molding the sidewalls of a tire, and two side plates, each shell insert being mounted to a side plate, wherein the tread sectors and the shell inserts are castings.

According to another aspect of the invention, the shell inserts each have a circumferential mounting rib on a back surface for inserting into a mounting groove in the side plate. The mounting groove is wider in the radial direction than the mounting rib to accommodate differential expansions upon heating of the shell insert and the side plate to ensure proper mating of the tread sectors and the shell inserts during the tire molding process.

The shell inserts have vents extending from the molding surface (the front surface) through to the back surface, and grooves formed on the back surface to connect with vent passages in the side plate. The side plates each include passages on the mating surface that connect to interior passages that may be connected to a vacuum source.

The mold further includes two bead rings for molding the bead areas of the tire. The bead rings in the assembled mold are position on each half of the mold and overlap a portion of the shell inserts and will cover any gap present between the shell insert and the side plate in that area.

A method for manufacturing a mold in accordance with the invention includes the steps of providing a casting model having the tread and sidewall features of a tire, the casting model having parting zones between the tread and sidewall, casting an element from the model, the cast element accordingly having parting zones between the tread and sidewall portions, and separating the cast element into a plurality of tread sectors and opposing sidewall shells.

According to a preferred method, the casting elements are made in top and bottom halves divided along or near an axial centerline. A single casting model may be used, or upper and lower half models may be made, as is convenient. The two cast elements are then cut apart, the upper half element being separated into upper tread sectors and an upper sidewall shell for an upper half of the mold, and a lower cast element being separated to form lower tread sectors and a lower sidewall shell for a bottom half of the mold.

According to an alternative embodiment, a casting model is made without a parting zone between the tread and sidewall, and for each of the upper and lower half, at least two cast elements are formed, a first cast element separated into a plurality of tread sectors and a second cast element separated into at least one sidewall shell.

An advantage of casting the molding parts, the tread sectors and sidewall shells from a single casting model is that deeper and more complex features can be formed in the sidewall shells, and the features extending from the tread onto the sidewall can be better aligned and better conformed in size, shape and appearance.

BRIEF DESCRIPTION OF THE DRAWINGS

The invention will be better understood by reference to the following detailed description read in conjunction with the appended drawings, in which.

DETAILED DESCRIPTION

Figure 1:
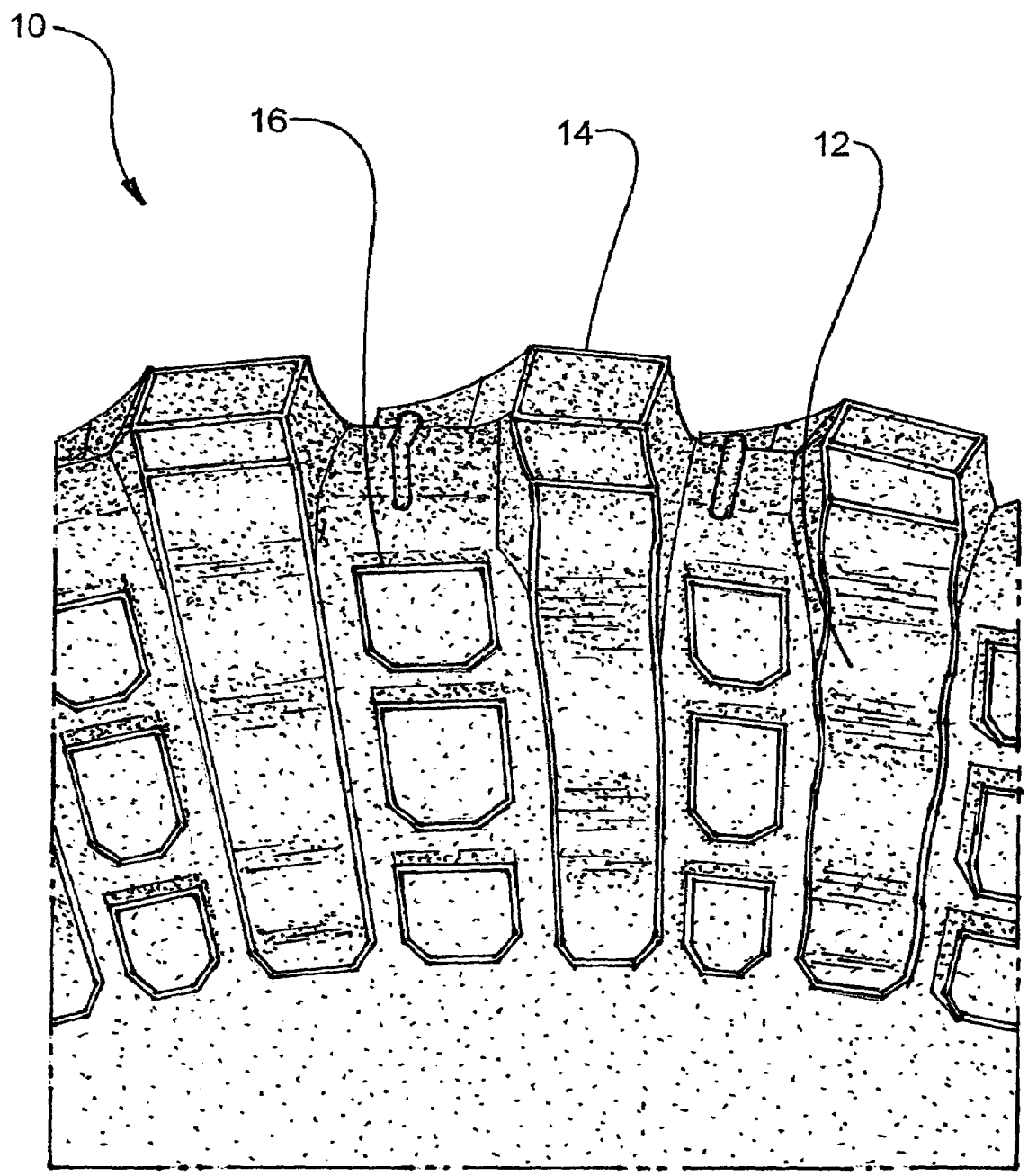
FIG. 1 shows a sidewall of a tire made with a mold in accordance with the invention.

FIG. 1 illustrates a sidewall of a tire made in accordance with the invention. The tire 10 sidewall includes a plurality of projecting elements 12 that are a continuation of tread elements 14. Other projecting elements 16 complement the design. In conventional tire molds, sidewall features are molded by a sidewall shell or plate, which is usually machined. Machining the deep recesses necessary to mold the projections, as well as other complex features, is difficult and time consuming. Tread elements are molded by a tread ring, which may be formed of a plurality of tread sectors or segments. It is possible to make the tread ring extend around to the sidewall region to mold projections, but this can create problems in mold use if the mold is of the segmented type. The tread sectors are movable during opening and closing of such molds to assist in releasing the cured tire from the mold. If the tread sectors extend too far into the sidewall region, movement and releasing the tire is difficult.

Figure 3:
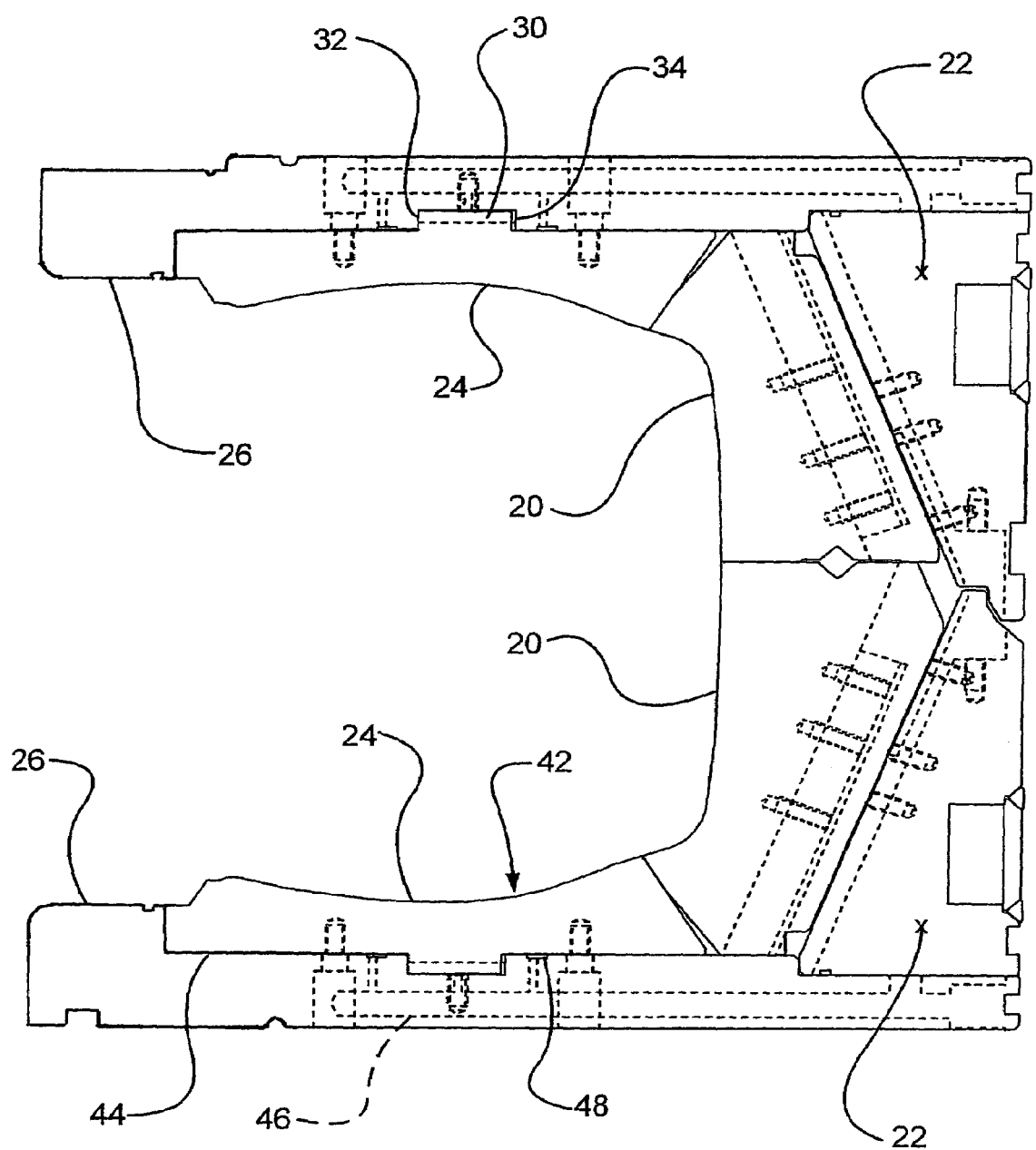
FIG. 3 is a section view of a mold in accordance with the invention.

As shown in FIG. 3, a tire mold according to the invention includes a plurality of tread sectors 20 for forming a tread portion of a tire, a mold back 22 for supporting the tread sectors and permitting movement between an open position and a closed position, two shell inserts 24 for molding the sidewalls of a tire, and two side plates 26. Each shell insert 24 is mounted to a side plate 26. Advantageously, the tread sectors 20 and the shell inserts 24 are preferably formed as aluminum castings, which facilitates forming the deep and complex features shown in FIG. 1. Other material which may be cast and which has the strength and durability needed for tire molding and vulcanizing may be used. The mold backs 22 and the side plates 26 may be formed of steel.

Figure 2:
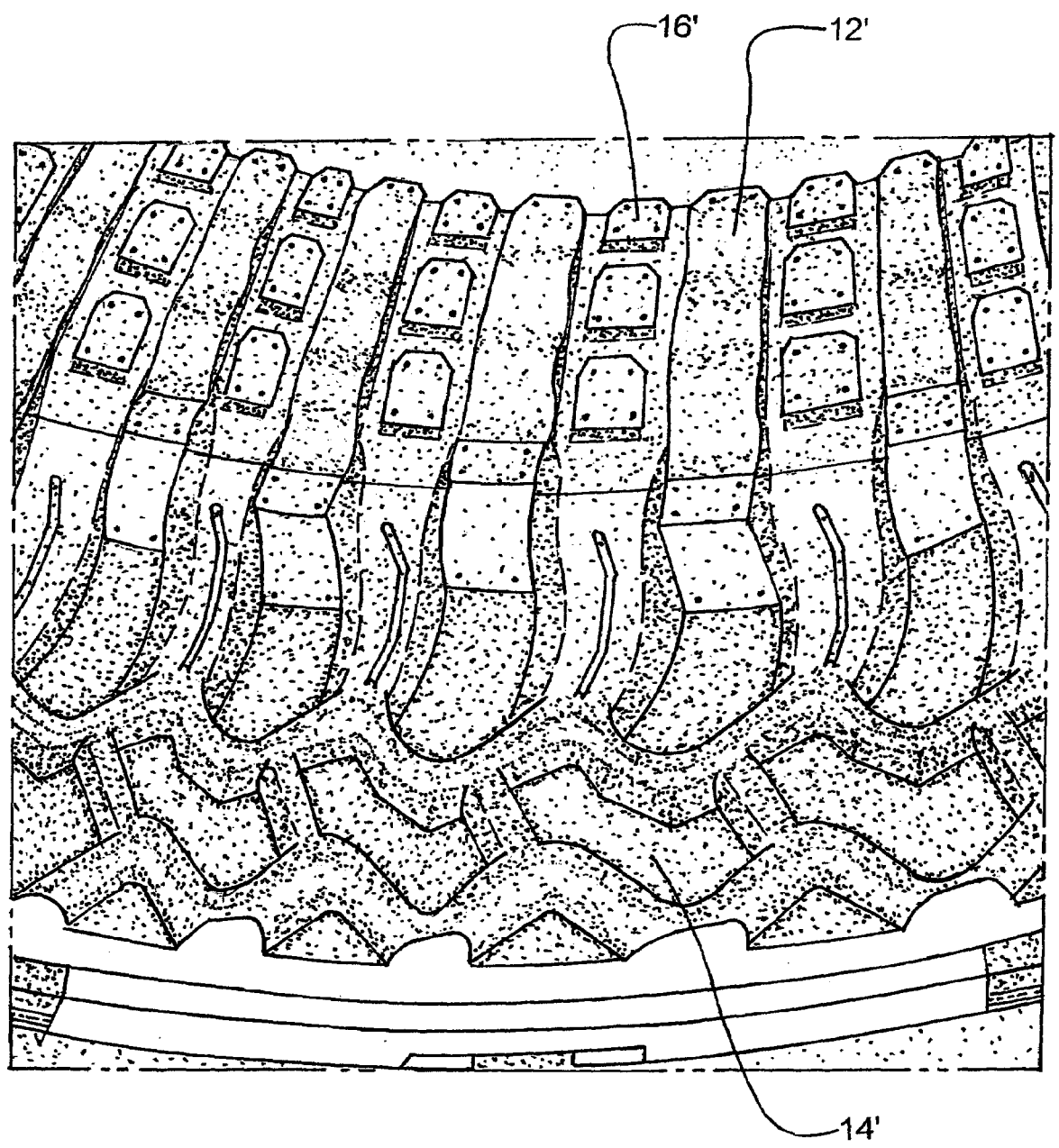
FIG. 2 shows a portion of a mold in accordance with the invention.

FIG. 2 shows an interior of an assembled mold according to FIG. 3 for the tire 10 of FIG. 1. As may be seen the tread molding features extend from the tread area to the sidewall region, and the tread molding elements 14' and sidewall molding elements 12', 16' are both aligned and consistent in shape.

Referring again to FIG. 3, the shell inserts 24 each have a circumferential mounting rib 30 on a back surface for inserting into a mounting groove 32 in the side plate. The mounting groove 32 is wider in the radial direction (indicated by the arrow R) than the mounting rib 30 to accommodate differential expansions upon heating of -the shell inserts 24 and the side plate 26 to ensure proper mating of the tread sectors and the shell inserts during the tire molding process. A small gap 34 is visible between the mounting rib 30 and mounting groove 32. FIG. 3 shows the mold in the cold condition, that is, at ambient temperature, and the gap 34 is in the position shown. When the mold is heated to the curing temperature, the differential thermal expansion of the shell insert 24 and side plate 26 will produce a gap on the opposite side as the gap shown in FIG. 3.

Figure 4:
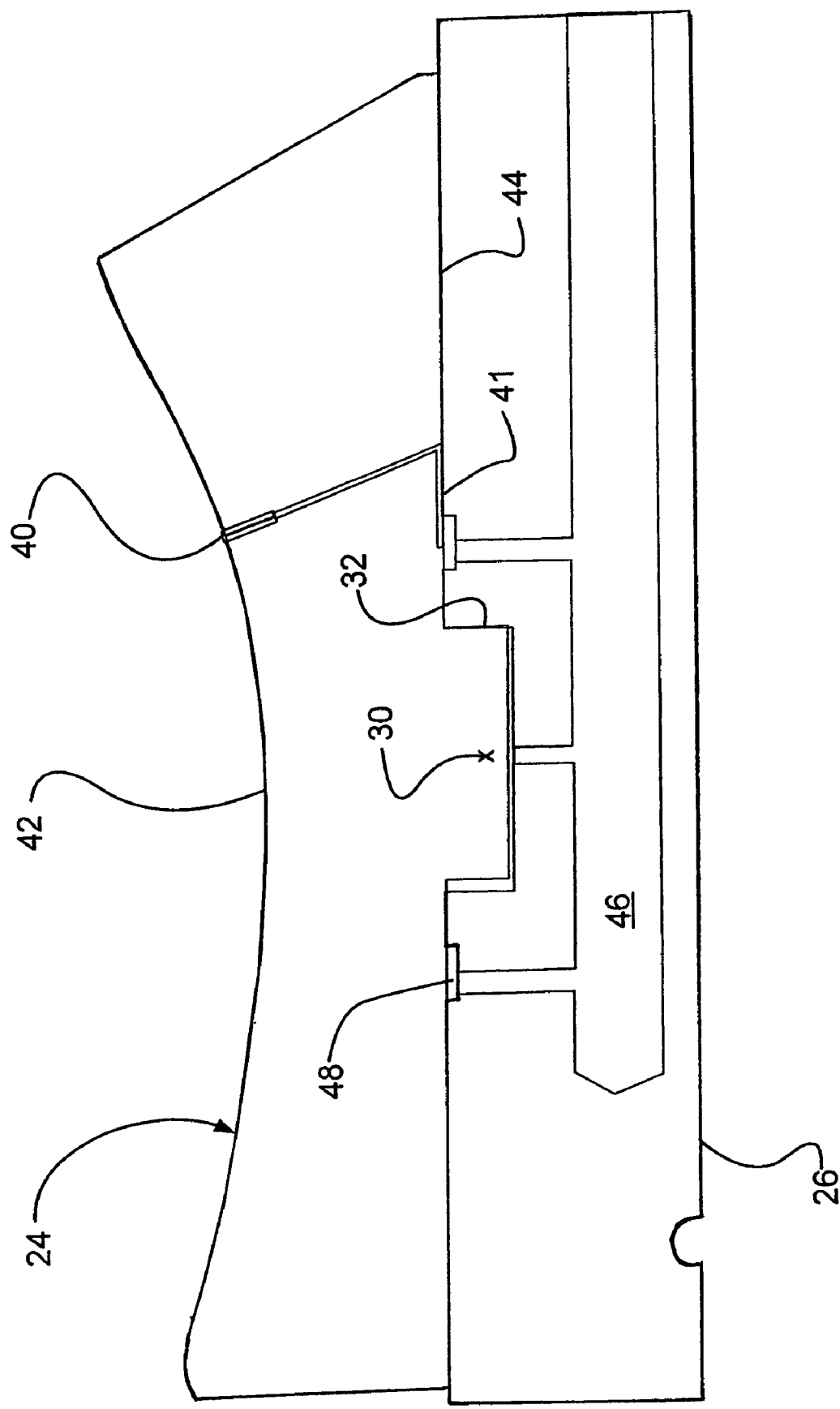
FIG. 4 is a section view showing an enlarged portion of a sidewall shell and side plate of the mold of FIG. 3.

Turning now to FIG. 4, the shell inserts 24 have holes or vents 40 extending from the molding surface 42 (the front surface) through to the back surface 44, and grooves 41 formed on the back surface to connect with vent passages 46 in the side plate. The side plates 26 each include passages or grooves 48 on the mating surface that connect to the interiorly formed vent passages 46 that may be connected to a vacuum source (not illustrated).

The mold further includes two bead rings (not illustrated) for molding the bead areas of the tire. The bead rings in the assembled mold are position on each half of the mold and overlap a portion of the shell inserts 24 and side plates 26 in the region radially distant from the tread sectors 20. The bead rings will cover any gap present between the shell insert and the side plate in that area.

Figure 5:
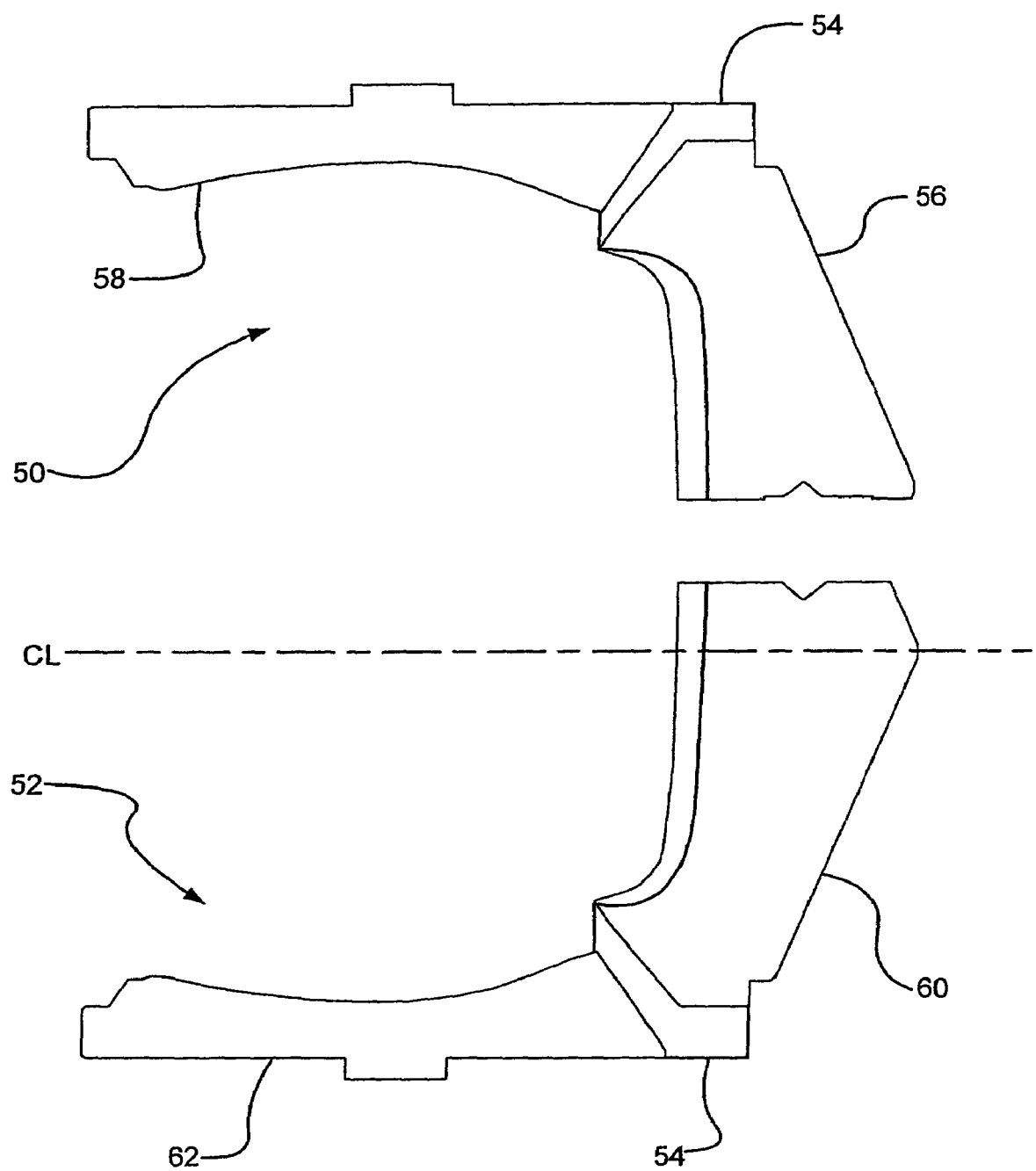
FIG. 5 is a section view of a first embodiment of casting elements for making a mold in accordance with the invention; and, FIG. 6 is a section view of a second embodiment of a casting element for making a mold in accordance with the invention.

Referring to FIG. 5, a method for manufacturing a mold in accordance with the invention includes the steps of providing a casting model having the tread and sidewall features of a tire, the casting model having parting zones between the tread and sidewall portions. At least one cast element 50 (or 52) is cast from the model, which accordingly also has parting zones 54 corresponding to the parting zones in the model. The casting element, through an appropriate process, for example, wire EDM cutting, is separated into a plurality of tread sectors and opposing sidewall shells.

According to a preferred method, two casting elements, an upper element and a lower element, are made. FIG. 5 illustrates an upper cast element 50 and a lower cast element 52. The cast elements are illustrated as being divided on a split line off center from an axial centerline for the complete mold. In this example, there are tread features at the axial center of the tread mold that it would have been disadvantageous to divide. In other cases, however, the cast elements may be split at the center line.

The two cast elements 50, 52, are then divided along the parting zones 54, the upper cast element 50 being separated to form upper tread sectors 56 and an upper sidewall shell 58 for an upper half of the mold, and the lower cast element 52 being separated to form lower tread sectors 60 and a lower sidewall shell 62 for a bottom half of the mold.

Figure 6:
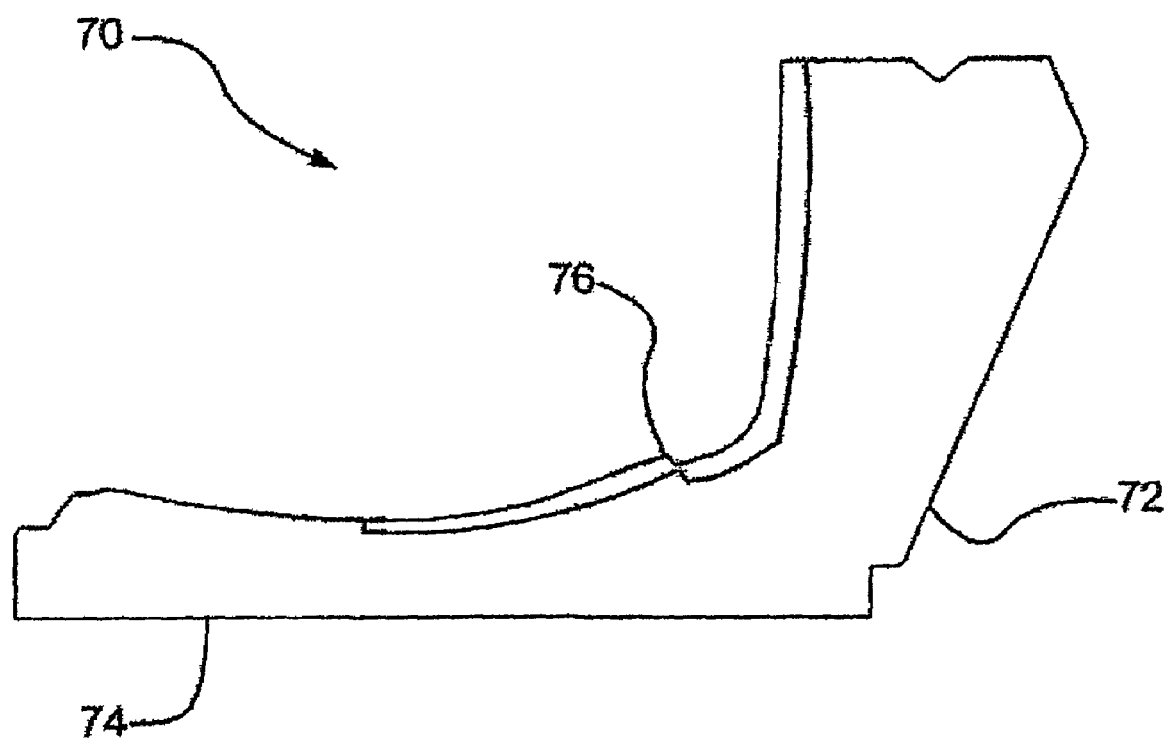

Referring now to FIG. 6, according to an alternative embodiment, a casting model (not illustrated) is made without a parting zone between the tread and sidewall or the tread sectors. The cast element 70 in FIG. 6 represents a bottom half cast element. In this embodiment, making the model is somewhat simplified because the tread and sidewall elements are not separated by the parting zone and alignment is facilitated. When separated, however, material from either the tread sector portion or the shell insert portion will be lost. Accordingly, for each desired mold half, at least two cast elements are formed; a first cast element is separated into a plurality of tread sectors 72 and a second cast element is separated into at least one sidewall shell insert 74. A small step 76 is formed on the shell insert portion 74 at the junction with the tread sector portion 72 to accommodate the change in size of the tread ring parts caused by loss of material in the wire EDM cutting operation.

For tread and sidewall designs that are symmetric about the axial center of the tire, it is necessary only to make a model representing half of the tire. For asymmetric tread and/or sidewall designs, or for treads where it is disadvantageous to divide the mold at the axial centerline, it is preferred to make a model representing the full tire.

An advantage of casting the molding parts, the tread sectors and sidewall shells, from a single casting model is that deeper and more complex features can be formed in the sidewall shells, and the features extending from the tread onto the sidewall can be better aligned and better conformed in size, shape and appearance.

What is claimed is:

1. A method for making a mold for a tire, comprising the steps of:
   providing a casting model having tread and sidewall features for a tire, the casting model having a parting zone between the tread and sidewall;
   casting a mold element from the model; and
   separating the cast element into a plurality of tread sectors and opposing sidewall shells.

2. The method according to claim 1, further comprising the step of dividing the casting model into two casting half models along an axial centerline, and wherein the step of casting a mold element comprises casting two mold elements, a first cast element being separated to form tread sectors and a sidewall shell for an upper half of the mold, and a second cast element being separated to form tread sectors and a sidewall shell for a bottom half of the mold.

3. The method according to claim 1, wherein the step of casting a mold element comprises casting at least two cast elements, and further comprising the steps of separating a first cast element into a plurality of tread sectors and separating a second cast element into a sidewall shell.

* * * * *